June 15, 1965 W. E. ELDRED 3,189,510
ARTICLE FOR FORMING HIGH TENSILE STRENGTH COVERING
Filed July 9, 1959 3 Sheets-Sheet 1

INVENTOR.
WENDELL E. ELDRED
BY
*Morton H Cheney*
AGENT

June 15, 1965  W. E. ELDRED  3,189,510
ARTICLE FOR FORMING HIGH TENSILE STRENGTH COVERING
Filed July 9, 1959  3 Sheets-Sheet 2

INVENTOR.
WENDELL E. ELDRED
BY John A. Young
ATTORNEY

United States Patent Office 3,189,510
Patented June 15, 1965

3,189,510
ARTICLE FOR FORMING HIGH TENSILE
STRENGTH COVERING
Wendell E. Eldred, South Bend, Ind., assignor to The
Bendix Corporation, a corporation of Delaware
Filed July 9, 1959, Ser. No. 825,958
8 Claims. (Cl. 161—143)

This invention relates to an article which is especially adapted for forming a laminated covering having high tensile strength making it suitable for such uses as the walls of vessels subjected to high internal pressure.

In the field of rocketry, the thrust on the rocket is developed from burning gases which are confined within a casing under exceedingly high pressures and temperatures. In order to withstand these pressures and temperatures, thick-walled casings have been thought necessary. These previously used constructions have the disadvantage of being heavy and, therefore, reduce the permissible load of fuel so that the effectiveness of the rocket is correspondingly diminished. Also, where the outer dimensions of the casing are fixed, the thick wall provided the casing detracts from the useful amount of fuel which is containable within the casing.

In an effort to produce lighter weight construction materials and ones providing thinner walled construction, which are capable of withstanding the necessary internal pressures and temperatures, the art has turned to laminated structures composed of cording or strands of material such as fiberglass. These strands, being in filament form, have considerable tensile strength and if formed properly into a laminated casing wall, will provide considerable resistance to internal pressure. The laminated construction is thus far the most promising construction for obtaining high tensile strength structures which are both lightweight and relatively thin in cross section. It has been found, however, that the laminated structures are not reliable in their strength capacity, i.e. some laminated constructions, particularly those using fiberglass, are not of consistent strength and vary considerably from their calculated strength. This variation of strength is attributed to the fact that the filament of fiberglass material is noncontinuous within the laminations and, furthermore, the filaments are "roped" or criss-crossed. No construction having a substantial degree of unreliability is acceptable for rocket casing applications.

Accordingly, it is one of the objects of the present invention to provide a lamination formed from tape, cable or the like which has a consistent high degree of strength which can be calculated and will invariably provide the predicted strength properties. The resulting lamination will also have the same strength when duplicated from one casing to the next as long as the dimensions remain the same.

Another object of the invention is to provide an article which is uniformly stressed throughout its length so that stress concentrations are prevented leading to failure of the laminated construction forming the wall of the casing.

Another object of the invention is to provide an article having improved tensile strength over laminated structures heretofore provided and of an equivalent weight and less cross section. As a result, casing structures may be produced which are of less weight, stronger and of thinner cross section. The result is greater efficiency in construction and operation of the casing.

It is a further object of the invention to provide a flexible article in the form of tape, cording and the like which can be helically wound over a curved surface to provide variously shaped casings.

It is another object of the invention to provide a casing construction which has greater fatigue life, retains a greater proportion of its strength at elevated temperature, and will exhibit less "creep" under pressure.

Other objects and features of the invention will become apparent from the following detailed description of the invention which proceeds with reference to the accompanying drawings, wherein.

Although the present invention will refer to a rocket casing, it will be understood that this is only one of numerous applications of the present invention and it is not to be inferred that this comprises the only usage of the invention. Wherever it is desired to provide a lightweight pressure vessel which requires high pressure capacity then the present invention is appropriate. The invention is further useful in making aircraft structures such as wings, control surfaces, etc.

Figure 5:
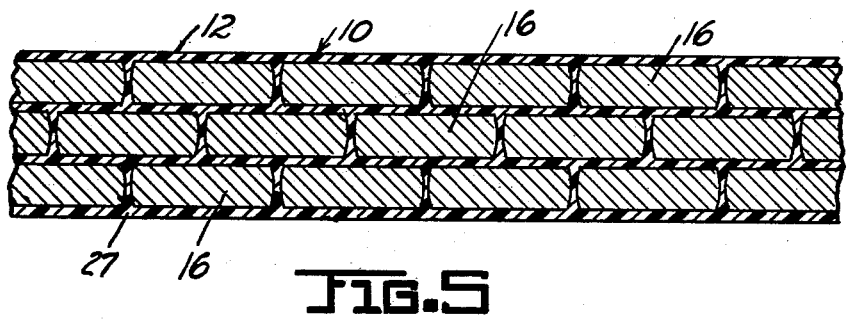
FIGURE 5 is an enlarged fragmentary sectional view taken through a flat tape having three layers of wire filaments, the filaments being of rectangular cross section.
Figure 6:
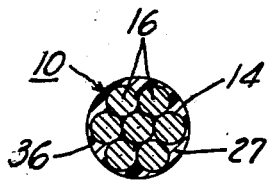
FIGURES 6 and 7 are transverse sectional views showing how the filaments may be formed into a cording of various size circular cross section, the cording then being applied over a mandrel to build the lamination; and, FIGURE 8 is a fragmentary isometric view of a casing having a laminated structure in accordance with the present invention.
Figure 7:
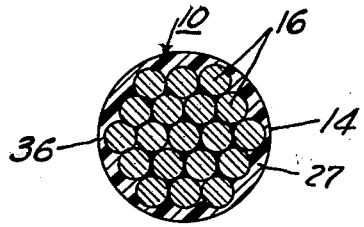
Figure 8:
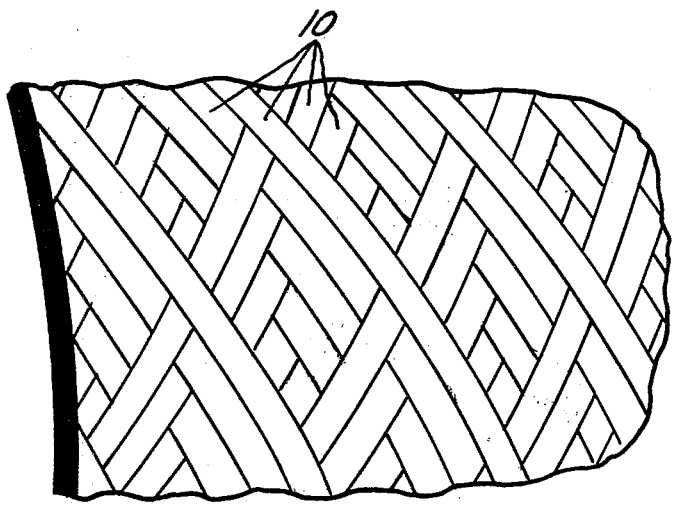

The article in one embodiment of the invention which forms the lamination is initially in the form of a tape 10 (FIGURES 3 to 7) which may be either flat (FIGURES 3 to 5) or round (FIGURES 6, 7) as indicated by reference numerals 12 in FIGURES 3 to 5 and 14 in FIGURES 6, 7. The flat tape 12 may consist of one layer of filaments 16 (FIGURE 3) or two (FIGURE 4) and the individual wire filaments 16 may be either round or rectangular (FIGURE 5).

Figure 3:
FIGURE 3 is a fragmentary transverse sectional view of the article in tape form.
Figure 4:
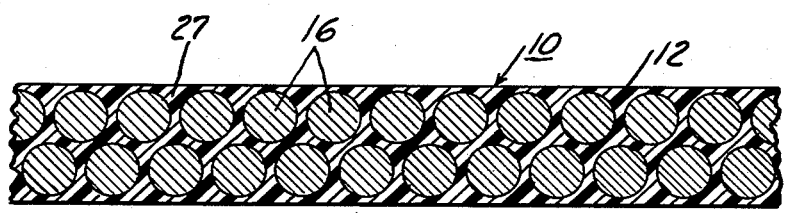
FIGURE 4 is a fragmentary transverse sectional view of a flat tape construction with a thickness formed of two layers of wire running lengthwise of the tape, the individual wire filaments being of circular cross section.

In the process of making the one layer, flat tape shown in FIGURE 3, individual filaments 16 of circular cross section wire are drawn from spaced spools 18 which are mounted for free rotation. The circular cross section filaments 16 may vary in diameter, one suitable diameter being .004 inch or $1.26 \times 10^{-5}$ inches$^2$ in area. The smaller diameter wires are advantageous because tensile strength of the wire increased with decrease of size because of cold working of the metal which occurs while it is drawn into the small diameter form. The drawing process appears to orient the crystal grains in such a manner that the metal exhibits greater tensile strength.

The strands 16 are next passed through a gathering die 20 having a slot opening 22 which is only slightly larger in length than the combined diameters of all of the wires. Thus, for a tape consisting of 49 wires, each having .004 diameter, the slot is .200 inch in width so that the wires are aligned in side-by-side relation. The thickness of the slot is .0045 so that all of the wires are gathered in a single plane and cannot cross one over the other. As the wire filaments emerge from the gathering die 20, they are all collinear and are spaced closely together in accordance with the proper width of the tape. The wires are next passed through a cleaning tank having a trichlorethylene which removes contaminants (grease, oil, dirt, etc.). The inlet opening and outlet openings in tank 21 are accurately sized to the dimensions of the wire filaments so that none of the filaments become disarranged.

Following the cleaning tank 21 is a die 24 with a slot corresponding to the proper dimensions of the tape so that the continuously traveling filaments retain their proper relative location.

The filaments are then passed through an applicator tank 26 containing liquid resin material which adheres to the filaments 16. The opening in the applicator tank 26 through which the filaments exit is precisely sized to the final dimensions of the tape so that excess resin is retained within the tank 26 and the filaments are spaced the exact distance apart with none of them lying crisscross relative to each other.

The tape must be kept flat across its width at all times or else the individual filaments are stressed nonuniformly at the time they are wrapped over the mandrel to form the lamination. In order to accomplish such flat condition, the wires are maintained, as described, at all times in side-by-side relation. Also the tension on the tape is distributed equally to each filament as it passes through the cleaning tank 21, dies 20, 24 and applicator tank 26. A typical resin which has been found satisfactory for making the tape is as follows, the materials being in parts by weight:

60 parts Shell 1031 Epon which is a viscous amber liquid at normal temperatures having an epoxide equivalent of between 210–240, a Gardner-Holdt viscosity of $Z_4$–$Z_8$, a bulk density of 40–45 lbs./ft.$^3$ and a molecular weight of 703.

30 parts Shell 828 Epon which is a viscous amber liquid at normal temperatures having an epoxide equivalent of between 190–210, an approximate weight of 10.27 lb./gal., a refractive index at 20° C. of 1.573 and a Gardner-Holdt viscosity of $Z_5$–$Z_6$ (see Patent No. 2,858,291 issued October 28, 1958).

10 parts 3M Cardolite NC–513 (flexing agent) which is an expoxidized cashew nut oil and which is a clear deep amber, extremely fluid, liquid having an epoxide equivalent of between 475–575, a specific gravity of 0.960–0.975 at 25° C., a viscosity of 100 cps. at 25° C. and a flash point (open cup) of 445° F. The term "Cardolite" is a registered trademark.

1 part boron trifluoride monoethylene amine (hardening agent).

This plastic composition will melt at about 212° F. and may be applied to the tape at this temperature. It should be noted that this plastic material is not critical and is only one of many suitable plastic binders.

The resin or binder indicated by reference numeral 27 in FIGURES 3 to 7 inclusive is generally a heat resistant material and good results have been obtained with the combination phenolic-epoxy-elastomeric materials. Some of the general considerations to be taken into account in selecting a suitable resin are that the resin be cured at a temperature below 575°–590° F. If this is exceeded, then the strength properties of the wire may be reduced. The binders mentioned require only about 400° F. to polymerize the resin binder, this being well below the draw temperature of the wire filaments. The resin is not fully cured until the casing lamination is completely formed.

As the tape emerges from the applicator tank 26, it may be cooled as by a fan 29 so that the temperature of the tape is quickly reduced to room temperature (about 72° F.). The tape is fully cooled within two feet of travel from the applicator when the tape is moving at about 16 feet per minute. This distance of travel during cooling should be kept as low as possible.

The tape is then passed over oppositely turning Teflon coated rollers 28. A liner 30 of Mylar tape is fed from a supply roll 32 so that as the tape 10 is wound onto reel 34 for storage each layer of tape is separated by an intermediate layer of Mylar, paper or other suitable material which prevents adjoining tape layers from sticking together and interfering with its usage at the time the casing is being wound.

The finished tape 10 is next wound over a mandrel in a basket weave pattern (FIGURE 1), the tape 10 being applied at an angle of about 55° with the horizontal center line, axis of rotation of the mandrel. The purpose of the basket weave is to locate the tape more closely in alignment with the principal stresses. For example, in a cylinder the hoop stresses are greater than the longitudinal forces so that the tape is more in alignment with the circumference of the cylinder. The same effect can be obtained by increasing the number of wraps circumferentially as compared to longitudinal wraps. Generally, the tape is wound over the mandrel until each section which is to form a part of the casing wall becomes covered by at least two thicknesses of tape running diagonally to each other. The process can be continued so that the wall thickness consists of two, four, six or any even number of thicknesses of tape.

It is to be understood that the present invention is not limited to a particular pattern of the tape winding as for example, "basket weave," longitudinal wrapping, transverse wrapping and the like. Also the invention is not limited to forming the filaments into any particular width tape. The tape may be formed in various widths and stored pending future usage. The tape is then "split" to the proper width for a particular usage. In some applications, no wind up storage reel 34 is used, but instead the tape product is applied directly to the mandrel (not shown).

Figure 1:
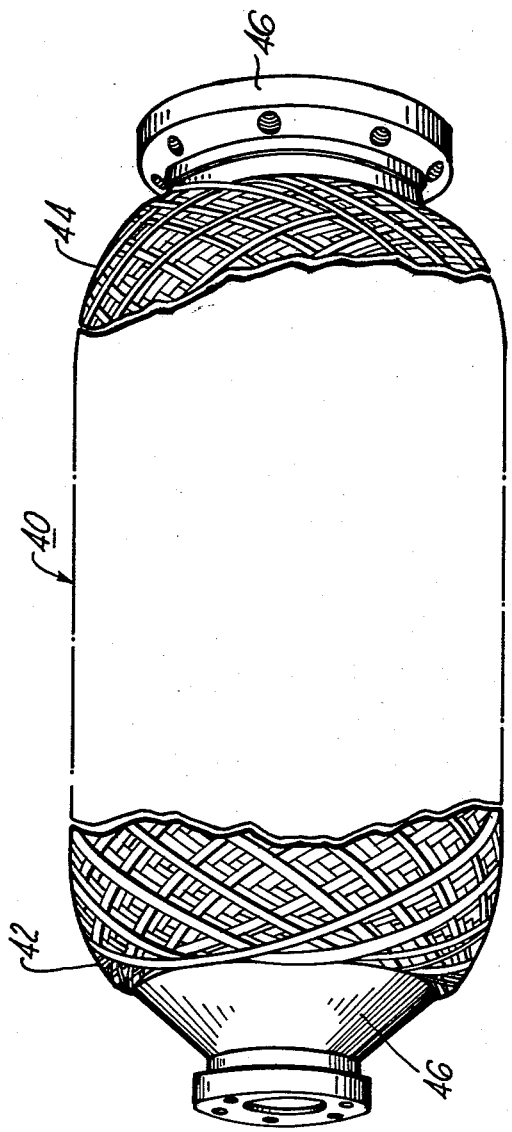
FIGURE 1 is a view of a rocket casing having a laminated wall structure made in accordance with the present invention.
Figure 2:
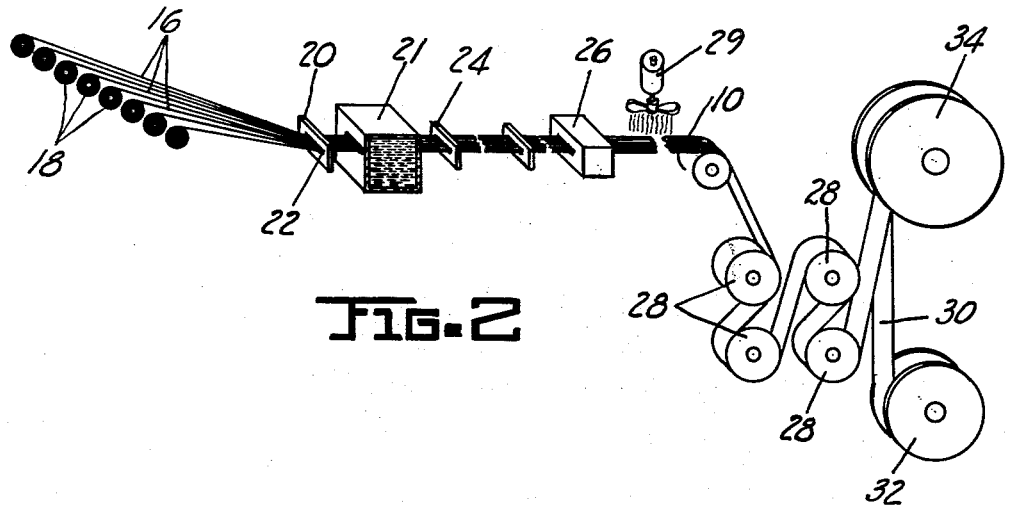
FIGURE 2 is an isometric view showing schematically the manner of making the article in a flat tape form.

The finished casing designated generally by reference numeral 40 in FIGURE 1 has a wall thickness of about .064 inch designed to withstand burst pressure of about 2800 p.s.i. At the ends 42, 44 of the casing are hemispherical steel members 46 which are adapted to receive fittings for mounting nozzles and the like. For some casings, these members 46 are omitted and the tape is wound over the mandrel at the ends to form the proper shape. After the tape is formed into the casing wall thickness, it is heat treated to "cure" or polymerize the resin binder. Casings constructed with the present invention have been tested and have exhibited strengths as high as 500,000 pounds per square inch, this being in the order of 50% improvement over equivalent high quality steel cases.

The remarkable increase of strength obtained with the present invention is attributed to several factors. One important factor is that the filaments 16 are formed as continuous lengths which are coextensive with the tape itself. As a result, there are no discontinuities of the wire filament along the longitudinal length of the tape. The filament 16 being coextensive with the tape 10 has a uniform strength across the width of the tape owing to the absence of dislocations and "splicing" which occur in previously used lamination structures. Another factor which contributes to the increased strength of the lamination is apparent from considering the cross section view of the tape (FIGURE 3). Each of the individual filaments 16, whether the tape consists of a single row or double row of wires, is oriented side by side with about .0001 inch spacing between the individual filaments. It is important that the filaments 16 be oriented side by side without crisscrossing and giving rise to a defect called "roping." If the filaments should cross one over the other along the length of the tape, then localized stresses will be set up causing failure of the tape. Quite unexpectedly, it is the precise location of the filaments 16, or more correctly, the constant side-to-side relation of the filaments 16 which produces a product that is stronger and will produce a lamination having a consistent calculable strength.

These considerations are directly accountable for the fact that I have been able to produce casings which are much improved over previous casings and which can be duplicated with a reliability heretofore unattained. Although the resin binder for each lamination is only in the order of a few thousands of an inch thick, it is capable of sustaining the nontensile forces since they are of a lower magnitude and the much higher tensile load is sustained exclusively by the filaments running lengthwise of the tape. It should be further noted that whereas the resin binder represents only 5% to 7% by weight of the tape, it is about 30% to 35% of the volume of the tape. A distinct advantage of the present invention is that the resin adheres readily to the metallic filaments 16; hence, the plastic does not tend to "craze" and the resin once cured produces a product having greater stability because of the improved bonding properties.

Another important advantage of the present invention is that the filaments do not creep appreciably so that tension in the tape is retained almost indefinitely.

The ductile metallic work-hardenable filaments offer a still further advantage in that the fatigue life is considerably advanced over the fiberglass type laminations. The reason for this may be attributed to the fact that the proportional limit and 0.2% yield strength have the same percentage value of ultimate strength in the high strength carbon wire used as in numerous relatively low strength steels of good fatigue characteristics. Lamination casings in accordance with the present invention are adapted for usages requiring refilling, as for example, in storing gases and liquid fuels under pressure. Ordinarily, such containers are rechargeable.

The ductile metallic filaments 16, being malleable, can be varied in cross section from circular to rectangular so as to offer a wide range of lamination thicknesses of equivalent strengths. For example, referring to FIGURE 5, the filaments 16 are usable in rectangular cross section as well as circular cross section (FIGURE 3) and the lamination produced from rectangular cross section filaments will produce the same lamination strength as the cirular cross section filament but in less lamination thickness. Another consideration is that the proportion of external area to volume increases as the cross sectional shape is changed from circular to rectangular and, therefore, the resin bonding is effective over a greater area and becomes more efficient. The possibility for change in cross sectional configuration of the filament provides the designer with a wide range of casing wall thickness for a given strength.

Quite often the design of the casing dictates an outer dimension, in which case the thickness of the casing wall determines the amount of fuel interiorly of the casing. It becomes important, therefore, to achieve the necesary casing wall strength with minimum wall thickness. The present invention has the advantage of providing the necessary strength with less casing wall thickness. Less margin of safety is required in casing wall thickness than less consistent structures, this also contributing to greater efficiency of the present invention.

Once the casing is wrapped, it is not prone to failure because of accidental handling mishaps. Slight dents or "dings," as they are sometimes called, on the surface of the casing will not give rise to structural failure as in the case of the solid metal casings.

If desired, the filaments can be formed from steel, titanium, tungsten, molybdenum or similar metals. The only requirement is that the metal be capable of being drawn into a fine wire or filament form and exhibit at least some degree of work hardening so as to obtain the necessary tensile strength. Binders other than organic binders are also usable. For examples, low melting alloys can be used as well as ceramics, ceramets and combinations of these materials.

The described laminated wall structure will retain its strength at high temperatures much better than fiberglass and this property can be further increased by selecting more heat resistant metallic filaments without detracting from the reliability of the casing strength.

For irregularly curved surfaces, as for example, funnel shaped members commonly found in rocket nozzles and the like, it is preferred to form the lamination from single strands 36 such as those shown in FIGURES 6 and 7 composed of a plurality of filaments 16 of circular cross section. A strand 36 of the preferred number of filaments is wound angularly over the surface of a mandrel to form the lamination which is then heated to cure the resin binder. In the final casing, substantially the entire wall is defined by at least two layers of cross lying threads to provide the necessary strength.

As a general rule, when tape is used to form the lamination, it is wound geodesically over the mandrel so as to follow a path of shortest distance so that the tape will be stressed uniformly across the width. With the single strand of FIGURES 6 and 7, such "geodesic" winding is not as essential.

Where the terms "tape" and "strand" are used in the following claims there is meant to be included filaments of ductile metallic wire formed in continuous lengths and located so as not to crisscross one over the other. Laminations may be constructed in accordance with the present invention while the "tape" is formed separately or is merely an intermediate which is directly applied to the mandrel. Also, the resin binder may be reduced in quantity when nontensile stresses are of a low order since the main purpose of the resin is to keep the filaments from buckling.

While the invention has been described with only certain selected embodiments of the invention, it will be understood that these there are only selected, preferred embodiments.

What is claimed is:

1. A tape comprising a plurality of ductile work-hardenable metallic filaments of a continuous length extending uninterruptedly through the length of said tape, said filaments being disposed in continual parallel alignment one with respect to the other to be in the same relative position one with respect to the other throughout the length of said tape, said tape being thereby stressed substantially uniformly throughout the length thereof, and a binder for said filaments adhesively securing said filaments together such that the uniform cross section distribution of said filaments within the tape is maintained.

2. A tape adapted for construction of walls of pressure vessels and constructed of at least two cross lying tape windings, said tape comprising a plurality of ductile work-hardenable metallic wire filaments constructed to extend unbroken as continuous parallel filaments coextensive with the length of said tape, each individual filament being disposed at the same relative position in the cross section of the tape throughout the length of the tape to provide an unvarying cross sectional structure which is substantially uniformly stressed throughout the length of said tape, and a binder for maintaining the same relative location of said filaments within said tape, said binder being also distributed through and about said filaments in an uncured state to form a tape having uncured surfaces that provide a homogeneous structure when curing overlapping tapes.

3. A flexible flat tape adapted for forming laminations, comprising a plurality of filaments of metallic ductile work-hardenable wire material, each individual filament being of a continuous length coextensive with said tape and disposed as a single row of filaments and lying side by side relatively to each other and at the same relative location to each other throughout said tape to provide uniform stress concentration, and a binder filling the voids between said filaments and coating said filaments to maintain separation thereof throughout their length, said binder being formed of a thermosetting resin.

4. The tape structure in accordance with claim 3 wherein each individual filament is of circular cross section.

5. The tape structure in accordance with claim 3 wherein each individual filament is of rectangular cross section.

6. The structure in accordance with claim 3 wherein a plurality of rows of filaments are superimposed one over the other to provide additional tape thickness.

7. A flexible tape adapted for forming laminations in high pressure vessels, said tape comprising a plurality of metallic work-hardenable wire filaments, each of said wire filaments being of the same circular cross section and uniform throughout its length, a centrally located filament of said tape, a plurality of additional filaments surrounding said centrally located filament to provide a cross sectional circular pattern of said tape, each said filaments being of continuous lengths coextensive with said tape, each said filaments being at the same relative parallel location throughout the length of said tape to provide uniform stress distribution thereon, and means for binding said filaments together to maintain the same relative location thereof within said lamination.

8. A tape for producing a lamination in the construction of pressure vessels, comprising a plurality of uniformly drawn ductile metallic filaments of work hardenable quality formed in continuous lengths and extending uninterruptedly through the extent of said tape, each said filament being in side-by-side relation with its contiguous filaments and retaining its same disposition relatively to the other filaments throughout the length of said tape which is dimensioned in width to be substantially the cumulative cross sectional dimensions of said filaments and of a thickness substantially equaling the cross sectional dimension of one of said filaments, and a heat hardenable resin binder for securing said filaments of wire together as tape.

References Cited by the Examiner

UNITED STATES PATENTS

| | | | |
|---|---|---|---|
| 2,202,013 | 5/40 | Lougheed | 161—14 |
| 2,479,828 | 8/49 | Geckler | 154—83 XR |
| 2,682,292 | 6/54 | Nagin | 154—102 |
| 2,758,342 | 8/56 | Squires | 154—90 |
| 2,758,951 | 8/56 | Case | 154—90 |
| 2,792,324 | 5/57 | Daley et al. | 154—90 |
| 2,902,083 | 9/59 | White | 154—90 |
| 2,979,431 | 8/61 | Perrault | 156—244 |

FOREIGN PATENTS 536,422  3/55  Belgium.

EARL M. BERGERT, *Primary Examiner.*

CARL M. KRAFFT, *Examiner.*